United States Patent [19]

Rieber et al.

[11] Patent Number: 4,607,183

[45] Date of Patent: Aug. 19, 1986

[54] DYNAMOELECTRIC MACHINE SLOT WEDGES WITH ABRASION RESISTANT LAYER

[75] Inventors: John C. Rieber, Louisville, Ky.; Jeffrey D. Sheaffer, Scotia; Russell E. Walthers, Saratoga, both of N.Y.

[73] Assignee: General Electric Company, Schenectady, N.Y.

[21] Appl. No.: 671,531

[22] Filed: Nov. 14, 1984

[51] Int. Cl.$^4$ .............................................. H02R 3/48
[52] U.S. Cl. ...................................... 310/214; 310/45; 310/215
[58] Field of Search ............... 310/214, 215, 259, 258, 310/254, 194, 43, 45, 161, 171; 428/245, 246; 336/197

[56] References Cited

U.S. PATENT DOCUMENTS

| | | | |
|---|---|---|---|
| 2,710,931 | 6/1955 | Tittel et al. | 310/214 X |
| 3,594,597 | 7/1971 | Kildishev et al. | 310/214 |
| 3,624,432 | 11/1971 | Merz | 310/214 X |
| 3,949,255 | 4/1976 | Brown et al. | 310/214 |
| 4,093,881 | 6/1978 | Lipták et al. | 310/214 |
| 4,159,562 | 7/1979 | Lipták et al. | 310/214 X |
| 4,184,091 | 1/1980 | Khutoretsky et al. | 310/271 X |
| 4,200,818 | 4/1980 | Ruffing et al. | 310/214 |
| 4,443,725 | 4/1984 | Derderian et al. | 310/214 |

Primary Examiner—R. Skudy
Attorney, Agent, or Firm—Paul Checkovich; Jerome C. Squillaro

[57] ABSTRACT

A dovetail wedge for retaining conductor bars in stator slots of a large dynamoelectric machine includes an embedding surface layer on surfaces thereof which contact the lamination surfaces in dovetail slots of the stator. The embedding surface layer permits the embossing thereof by irregularities of the surface of the laminations. A range of thicknesses for the embedding layer provides sufficient protection against abrasion and a sufficient lubricity during wedge installation without being so thick that long-term dimensional instability may permit loosening of the conductor bars. The embedding layer is preferably a natural fiber and most preferably a woven or non-woven cotton fiber.

30 Claims, 4 Drawing Figures

DYNAMOELECTRIC MACHINE SLOT WEDGES WITH ABRASION RESISTANT LAYER

BACKGROUND OF THE INVENTION

The present invention relates to dynamoelectric machines and, more particularly, to dovetail slot wedges for securing conductors within slots of a laminated magnetic core structure.

In dynamoelectric machines and, particularly in the stators of large dynamoelectric machines, it is conventional to huild up an annular magnetic mass by stacking thin laminations of magnetic material on key bars. The laminations conventionally include slot-shaped openings therein which are aligned in the stacking process with corresponding openings in all other laminations to form a set of parallel slots in the inner surface of the annular magnetic mass. One or more conductors are placed in each slot to receive the generated electricity if the dynamoelectric machine is a generator, or to receive the driving electric power if the dynamoelectric machine is a motor. The conductors in the slots of a large dynamoelectric machine carry large currents and are subjected to large magnetic fields. They therefore experience very high forces tending to displace them within the slots. If steps are not taken to prevent such an occurrence, the forces acting on the conductors are sufficient to displace them in the slots and to damage, or destroy, the stator.

In order to firmly secure the conductors in the slots, it is conventional to provide dovetail shaped portions in the slots in the laminations. The dovetail-shaped slots are positioned so that, when corresponding dovetail-shaped wedges are placed in the slots, the conductors are securely retained in place. Such wedges were originally made from hardwood and were driven into the dovetail slots atop the conductors. More recently, wedges have been made of cotton-reinforced phenolic resin. Over a projected 40-year lifetime of a large dynamoelectric machine, such wedges may shrink enough to permit loosening of the restraint applied to the conductors thereby permitting development of conductor vibration and creating the requirement for replacement of the wedges.

Current technology employs dovetail wedges having glass fiber reinforcement in a thermosetting resin. Such glass fiber/resin systems provide sufficient long-term dimensional stability to avoid shrinkage and have good resistance to the temperatures likely to be experienced in normal and overload use. The use of glass fibers as the reinforcing material invokes other problems which are not experienced when hardwood or cotton-reinforced phenolic wedges are used.

Glass fibers are abrasive. During use, the large magnetic forces generated by the rotor of a large dynamoelectric machine are sufficient to distort the cross section of the stator from circular to slightly elliptical The major axis of the elliptical distortion rotates with the magnetic poles of the rotor at a speed of, for example, 3600 RPM. The stator slots are thereby cyclically widened and narrowed a very small amount at a frequency of 120 Hz as the maxima and minima of the elliptical distortion travel therepast twice per revolution of the rotor.

The motion of the mating surface of the dovetail slots with respect to the dovetail wedges produced in use by the cyclic widening and narrowing of the dovetail slots includes a rubbing component which can remove the surface coating of resin thereby revealing the glass fiber reinforcement beneath it. Once the glass fibers are contacted, further rubbing of the abrasive glass fibers against the edges of the laminations can abrade the edges of the laminations to form a magnetically and electrically conductive powder which, if allowed to spread throughout the dynamoelectric machine, may precipitate electrical failure. In addition, the removal of material due to the mutual abrasion of the mating surfaces of the dovetail slots and dovetail wedges may eventually reduce the restraining forces applied to the conductors by the wedges and, in an extreme case, may permit motion of the conductors in the slots with the same undesirable results which may ensue from shrinkage of earlier types of wedges.

Laminations are conventionally formed in a punching operation for forming the conductor slots, including the dovetail-shaped portions thereof. After punching, the laminations are coated with an insulating layer of a conventional inorganic lacquer to prevent eddy current flow between adjacent laminations. When laminations are stacked to form a stator core, manufacturing tolerances in forming and stacking the laminations permit the edges of some of the laminations to protrude further into the dovetail slot than others. These protrusions may be on the order of, for example, about 0.01 inch. In one method of installation, rigid wedges are driven lengthwise into place in the slot. The protruding edges of laminations are relatively fragile and may bend if rigid wedges are driven into the dovetail slots. The insulation on the edges of deformed laminations may be scraped or flaked off. Such bending of the edges of laminations, and the removal of insulation therefrom, may defeat the inter-lamination insulation and permit eddy current flow with consequent heating and reduced eifficiency. Wedges of the prior art have sufficient resilience and lubricity to substantially avoid or reduce damage during the driving of the dovetail wedges.

The change to dovetail wedges including glass fiber reinforcement, while desirable from the standpoint of long-term dimensional stability and resistance to heat, complicates the problem of driving the wedges into place. The glass-fiber-reinforced wedges are harder and lack the lubricity of the earlier wedges. Thus, the driving operation is more likely to damage the edges of the laminations and to adversely affect the inter-laminar insulation.

The driving operation also has an adverse effect on the glass-fiber-reinforced wedge. During the wedge driving operation, the resin surface layer originally covering the glass fibers can be scraped from the surface of the dovetail wedge by the protruding edges of the laminations to expose the abrasive glass fibers. The exposed glass fibers, besides being able to remove the exposed insulation from the laminations during the remainder of the wedge driving operation, also lie exposed to produce abrasion during use of the dynamoelectric machine as described hereinabove.

One technique for reducing the problems inherent in the wedge driving operation is disclosed in U.S. Pat. No. 4,200,818, in which a layer of an aromatic polyamide fiber in a thermosetting resin is bonded to those surfaces of a glass fiber reinforced dovetail wedge which may come into contact with the laminations. The polyamide fiber layer provides a measure of resilience and lubricity to the surface similar to that provided by hardwood wedges thereby reducing the removal of the insulation during the wedge driving operation. This patent is concerned solely with the wedge driving operation and does not address the problem of abrasion during operation of the dynamoelectric machine.

The use of a polyamide fiber reinforced layer on a dovetail wedge is not favored except when it is absolutely necessary. One type of aromatic polyamide fiber, which the referenced patent discusses with approval, is a type which is so resistant to cutting that it is used, for example, in the manufacture of bulletproof clothing. This very property makes it very difficult and expensive to cut the material into the sizes and shapes desired for coating a dovetail wedge. In addition, such material is many times as expensive as other more conventional materials, and this cost ratio does not appear likely to change in the near future.

A different approach to the insertion of dovetail wedges in accordance with a preferred embodiment of the invention eliminates the wedge driving operation altogether thereby obviating any concern about bending the laminations during the wedge driving operation. In this approach, each dovetail wedge includes a tapered lower surface. The dovetail wedge is loosely fittable within the dovetail slot and is freely axially movable along the dovetail slot without forcible bearing contact against the edges of the laminations. When the dovetail wedge is in its final axial location, a slide member having a mating tapered upper surface to the tapered lower surface of the dovetail wedge is driven under the inclined inner surface of the dovetail wedge to urge the facing surfaces of the dovetail wedge directly into contact with the edges of the laminations without the need for driving the wedges along the dovetail slot. Thus, the bending of the edges of protruding laminations and any attendant removal of insulation therefrom during a wedge driving operation is eliminated, even when a glass fiber reinforced wedge is used.

OBJECTS AND SUMMARY OF THE INVENTION

Accordingly, it is an object of the invention to provide a dovetail wedge for a dynamoelectric machine which overcomes the drawbacks of the prior art.

It is a further object of the invention to provide a dovetail wedge for a dynamoelectric machine which includes an embedding surface at least on those surfaces of the dovetail wedge which are intended for forceful contact with a dovetail slot into which irregularities in edges of laminations of the dovetail slot may become embedded without breaking through an underlying layer of resin to reveal a glass fiber reinforcement.

It is a further object of the invention to provide a layer on a bearing surface of a dovetail wedge which is effective to substantially eliminate long-term abrasive wear of laminations of a dynamoelectric machine.

It is a still further object of the invention to provide means for reducing generation of electrically and magnetically conductive dust produced by abrasive contact between bearing surfaces of dovetail wedges and dovetail slots of a dyanamoelectric machine.

Briefly stated, a dovetail wedge for retaining conductor bars in stator slots of a large dynamoelectric machine includes an embedding surface layer on surfaces thereof which contact the lamination surfaces in dovetail slots of the stator. The embedding surface layer permits the embossing thereof by irregularities of the surface of the laminations. A range of thicknesses for the embedding layer provides sufficient protection against abrasion and a sufficient lubricity during wedge installation without being so thick that long-term dimensional instability may permit loosening of the conductor bars. The embedding layer is preferably a natural fiber and most preferably a woven or non-woven cotton fiber.

The above, and other objects, features and advantages of the present invention will become apparent from the following description read in conjunction with the accompanying drawings, in which like reference numerals designate the same elements. cBRIEF DESCRIPTION OF THE DRAWINGS FIG. 1 is a transverse cross section of a portion of a stator core of a dynamoelectric machine including a stator slot containing a dovetail wedge according to an embodiment of the invention.

Figure 4:
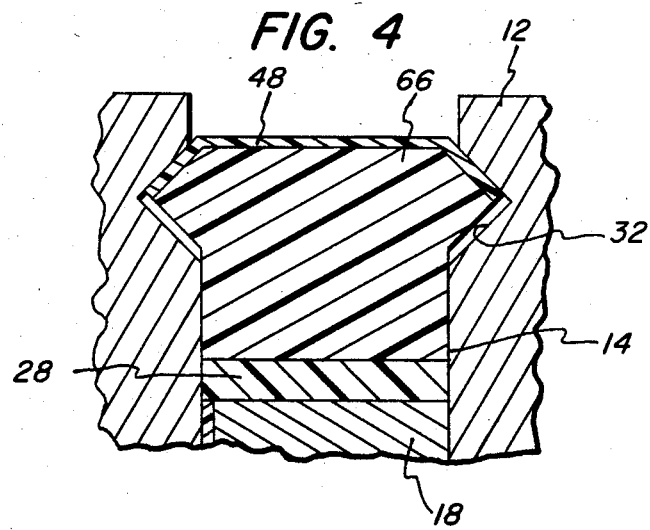

FIG. 4 a transverse cross section of a portion of a stator core including a one-piece dovetail according to a further embodiment of the invention.

DETAILED DESCRIPTION OF THE PREFERRED EMBODIMENT

Figure 1:
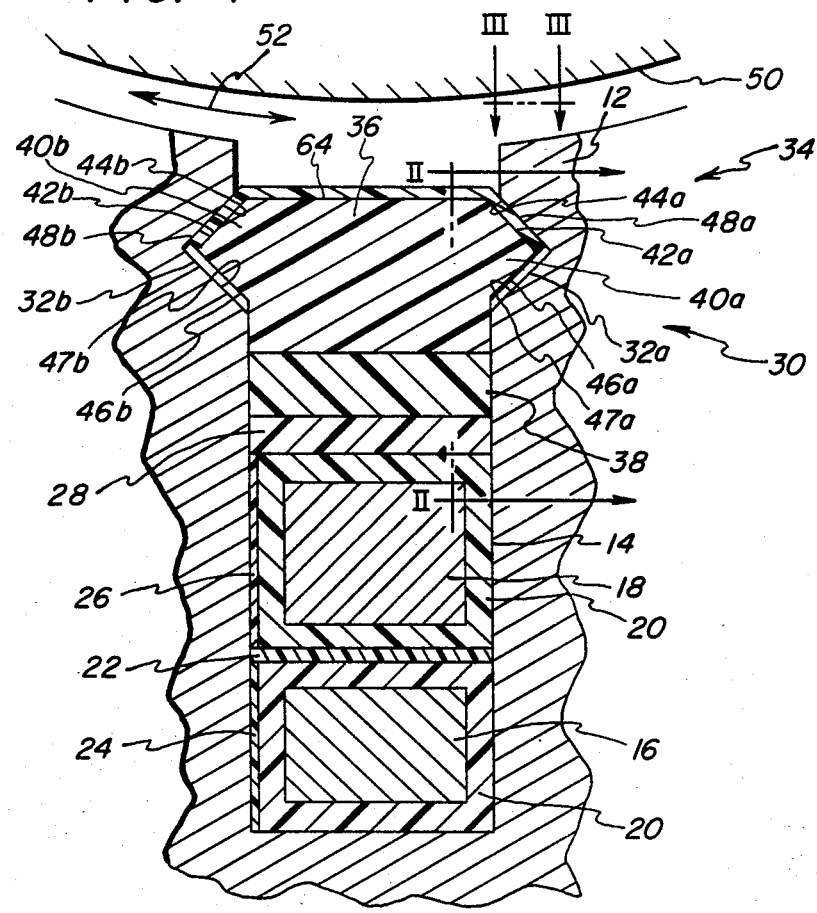

Referring now to FIG. 1, there is shown, generally at 10, a portion of a stator core of a dynamoelectric machine. As is conventional, stator core 10 is built up of a plurality of thin laminations 12 which may be, for example, about 0.02 inches thick. Each lamination 12 includes one or more slots 14 therein which are aligned, in the assembled stator core 10, to form slots which extend the entire axial length of stator core 10. One or more conductors are conventionally disposed in each slot 14. For example, a bottom conductor bar 16 may be disposed in the bottom of slot 14 and a top conductor bar 18 may be disposed atop bottom conductor bar 16. Conventional conductor bar insulation 20 may be disposed about bottom conductor bar 16 and top conductor bar 18 and a layer of filler material 22 may he disposed between them. A non-metallic side ripple spring 24 is disposed in slot 14 at one side of bottom conductor bar 16 to urge it into stationary frictional contact with an opposed side of slot 14. Similarly, a non-metallic side ripple spring 26 is disposed in slot 14 alongside top conductor bar 18 for urging it into stationary frictional contact with an opposed side of slot 14. A layer of filler material 28 may be disposed atop top conductor bar 18.

A dovetail slot 30 is formed in slot 14 by opposed notches 32a and 32b spaced above layer of filler material 28. A two-part, or piggy-back, dovetail wedge 34 is fittable into dovetail slot 30 to provide substantially pure radial restraining force on top conductor bar 18 and bottom conductor bar 16. Dovetail wedge 34 consists of a wedge 36 and a slide 38. Wedge 36 includes angled lips 40a and 40b having angled bearing surfaces 42a and 42b in face to face contact with corresponding angled abutment surfaces 44a and 44b of notches 32a and 32b. Lower surfaces 46a and 46b of angled lips 40a and 40b are out of bearing contact with upward-facing angular surfaces 47a and 47b of notches 32a and 32b, respectively. An embedding layer 48a on angled bearing surface 42a, and a corresponding embedding layer 48b on angled bearing surface 42b, is provided to prevent direct contact between angled bearing surface 42a and angled abutment surface 44a, as well as between angled bearing surface 42b and angled abutment surface 44b respectively, as will be more fully detailed hereinafter.

A cyclic opening and closing of slot 14 at 120 Hz (in an example case of a 3600 RPM two pole dynamoelectric machine) produced by an elliptical distortion of stator core 10 by the magnetic field of a rotor 50, is represented by double headed-arrows 52 at the outer extremity of slot 14. It will be envisioned that the motion represented by double headed-arrows 52 tends to produce a relative motion of angled abutment surfaces 44a and 44b with respect to angled bearing surfaces 42a and 42b that is principally normal to their contact planes but which, due to the inclinations of the contact planes, may also include a rubbing component of relative motion directed along their contact planes.

Figure 2:
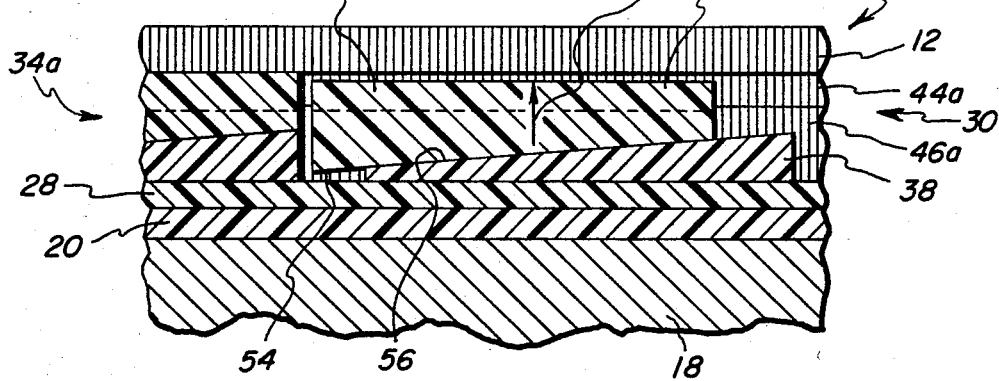
FIG. 2 is an axial cross section taken through the stator slot of FIG. 1 taken along II—II of FIG. 1.

Referring now to FIG. 2, a partly-installed dovetail wedge 34 is shown alongside a fully-installed dovetail wedge 34a in dovetail slot 30. Each dovetail wedge 34 is conventionally from about 4 to about 8 inches long with a plurality of dovetail wedges 34 being disposed end to end to fill the full length of dovetail slot 30. It will be noted that wedge 36 has an inclined lower surface 54 which provides a bearing surface for an inclined upper surface 56 of slide 38. To install dovetail wedge 34 in dovetail slot 30, wedge 36 is freely slid into position against previously installed dovetail wedge 34a. This is possible because, until slide 38 is installed, wedge 36 fits loosely in dovetail slot 30. Slide 38 is slid into position with inclined upper surface 56 sliding against inclined lower surface 54 to thereby provide a purely radial urging on wedge 36, as indicated by an arrow 57, whereby embedding layers 48a and 48b (not shown in FIG. 2) are moved directly and radially into contact with angled abutment surface 44a (and angled abutment surface 44b, not shown) of dovetail slot 30. When slide 38 is driven home, the relationships of the parts of dovetail wedge 34 are the same as the relationships of corresponding parts of fully-installed dovetail wedge 34a.

Figure 3:
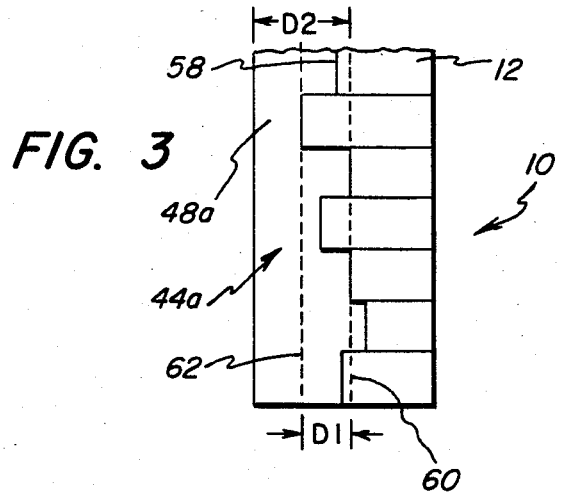
FIG. 3 is an enlarged cross section of a surface made up of ends of laminations illustrating the irregularities produced by manufacturing tolerances.

Referring now to FIG. 3, there is shown a highly enlarged cross sectional view of angled abutment surface 44a of stator core 10. Due to manufacturing tolerances, tips 58 of laminations 12 which make up angled abutment surface 44a, for example, do not lie in the same plane. Instead, angled abutment surface 44a is best identified by a mean surface level 60, indicated by a dashed line about which the actual positions of tips 58 may vary. This variation, in a practical manufacturing process, may include protrusion of some of tips 58 to a peak surface level 62, as indicated by a dashed line, which may extend a distance D1 beyond mean surface level 60. Distance D1 may be, for example, about 0.01 inches. If a properly chosen embedding layer 48a is provided which has a thickness of D2, which bears a predetermined relationship to protrusion distance D1, then the protruding tips 58 are able to embed themselves in embedding layer 48a without producing enough contact pressure to break or cut into embedding layer 48a. That is, protruding tips 58 of angled abutment surface 44a embed or emboss themselves into the material of embedding layer 48a until mean surface level 60 of angled abutment surface 44a fully bears against a surface of embedding layer 48a and thereby spreads the contact forces over the entire contact area. We have discovered that a ratio of D2 to D1 of at least 1.2 is satisfactory to provide substantial protection against angled abutment surface 44a coming into direct contact with the underlying material of wedge 36 which may be, for example, a glass fiber reinforced thermosetting resin such as, for example, a polyester resin. It is desirable to keep embedding layer 48a as thin as possible while still providing complete embedment of tips 58. At a thickness of more than about 0.1 inch, the shrinkage exhibited by most non-abrasive fibers over a 40-year lifetime under the anticipated temperature conditions, may be sufficient to permit looseness to develop.

If closer control of the tolerances on laminations 12 is achieved, then embedding layer 48 can be made thinner than the value stated above. Improving the tolerances by a factor of about two appears achievable and thus establishes a lower limit on the thickness of embedding layer 48 of about 0.005 inch. Thus, a preferred range of thickness of embedding layer is established of from about 0.005 to about 0.1 inch.

In the preferred embodiment, we have achieved satisfactory protection using from one to three plies of fabric, each one of which provides a cured thickness of about 0.008 inch. In the most preferred embodiment, we use two plies of cotton fabric, each one of which provides a cured thickness of about 0.008 inch.

Achieving large values of thickness of embedding layer 48a may present a processing problem even if motivation were found for using such large values of thickness. If achievement of a large value of thickness is attempted using many plies of fiber, it becomes difficult to mold the wedge. It may be possible to produce a thickness of about 0.1 inch using two thicknesses of a thick cotton fabric or bat. In the preferred embodiment, a ratio of D2 to D1 of from about 1.2 to about 10 is employed. In a more preferred embodiment, a ratio of D2 to D1 of from about 1.2 to about 2 is employed. In the most preferred embodiment, a ratio of D2 to D1 of from about 1.4 to about 1.8 is used. Greater thicknesses of D2 may be employed without departing from the present invention. One limit on the thickness of D2 is dependent upon the nature of the material comprising embedding layer 48a. Some of the more suitable materials to be discussed hereinafter are dimensionally unstable in large thicknesses and thus exhibit shrinkage when excess thicknesses thereof are used.

Any suitable non-abrasive material may be employed as a reinforcing material in embedding layer 48a. Most natural fibers appear to be suitable including hemp, sisal, jute, flax and cotton since these are generally non-abrasive materials which may be readily incorporated into a resin matrix. Certain synthetic resins such as, for example, polyester or polytetrafluoroethylene (Teflon) in either fiber or film form, may also be suitable. In addition, combinations of different fibers such as, for example, a combination of woven or non-woven cotton or other natural fibers with woven or non-woven synthetic fibers may be chosen for a combination of properties which such a combination provides. One such combination may include a cotton fabric with a minor amount of a polymer fiber.

If an improved lubricity is desired in a particular application, a combination of a fiber and a powder may be employed. For example, a cotton fiber impregnated with a suitable liquid resin which contains a proportion of particles of polyethylene, polypropylene, Teflon or other lubricating material may, after curing on the surface of angled bearing surface 42a (shown in FIG. 1), provide improved performance over a similar fabric and resin system which omits the particles of lubricating material from the resin. A multi-layer system may also be employed. For example, a surface layer of a cotton fabric-reinforced resin with a backing layer of a synthetic fiber-reinforced resin may be satisfactory. Both layers in such a two-layer system are preferably pre-pregged with the same, or different, resins and are cured at the same time. A further multi-layer system may include, for example, a surface layer employing cotton fiber reinforcement, an intermediate layer employing a synthetic fiber reinforcement and an inner layer employing a cotton fiber reinforcement.

In the preferred embodiment of the invention, we have discovered that a two-ply layer of prepregged woven cotton cloth gives satisfactory protection without any observed cutting or abrasion. Each layer of cotton cloth provides a cured thickness of about 0.008 inches. The two-ply structure therefor provides a total thickness of about 0.016 inches. For a value of D1 equal to 0.01 inches, this provides a ratio of D2 to D1 of about 1.6 and is well within the most preferred range. When such a two-ply cotton reinforced embedding layer 48a was tested in use and later examined, it was observed that the irregularities of angled abutment surface 44a produced an embossed mirror image in the material of embedding layer 48a without cutting into embedding layer 48a or loss of material. Since cotton fabric is well known for its ease of working and for its low cost, we consider such a structure for embedding layer 48a to be preferred.

It should be particularly noted that the dimension D2 cannot be specified as an absolute value. Instead, D2 can only be specified in relationship to the protrusion D1 beyond the mean surface of angled abutment surface 44a. If it were possible to substantially reduce the value of D1 by a factor of 5 by employing, for example, closer manufacturing tolerances, the thickness D2 of embedding layer 48a may be correspondingly reduced. Similarly, if practical manufacturing tolerances require that D1 be several times greater than the nominal value of 0.01 inches used in the above example, then the minimum thickness D2 must be proportionately increased. In both cases, however, the minimum thickness D2 of embedding layer 48a remains 1.2 times the maximum protrusion of tips 58 beyond mean surface level 60.

Returning to FIG. 1, as noted in the preceding, the only surfaces of wedge 36 which contact laminations 12 are found on angled bearing surfaces 42a and 42b. Embedding layers 48a and 48b may therefore be limited to these surfaces. Due to the cheapness and workability of the cotton-reinforced material in the preferred embodiment, however, manufacturing convenience makes it desirable to also carry the cotton-reinforced material over an upper surface 64. This permits laying in a double layer of pre-pregged cotton fabric in a mold, laying in a glass-fiber reinforced mass upon the fabric layer and curing the mass with suitable heat and pressure for a duration sufficient to mold the mass to the shape of the mold and to cure the resins in both the surface layer and in the body of dovetail wedge 34. For manufacturing convenience, and to ensure that complete coverage of angled bearing surfaces is achieved, the pre-pregged cotton fabric may at least partly overlap lower surfaces 46a and 46b.

The above description of the preferred embodiment in which a woven cotton or other fabric is employed as a reinforcement in an embedding layer should not be construed to exclude a non-woven fabric from the scope of the invention. On the contrary, the reinforcement in a single-ply embedding layer, or in one or more of the layers in a multi-ply embedding layer, may be of non-woven mat without departing from the spirit and scope of the invention.

Referring now to FIG. 4, a one-piece dovetail wedge 66 is shown according to a further embodiment of the invention. One-piece dovetail wedge 66 is driven axially into position along the dovetail slot as described in the background section hereof. In the referenced patent, the use of an aromatic polyamide was disclosed for protecting the surface of the slot wedge during the wedge driving operation using a facing layer of a mat of aromatic polyamide fiber, impregnated with a thermoset resin. The referenced patent was innocent of any disclosure of the performance of the facing layer in use. We believe, however, that an embedding layer 48a, having the charaieristics according to an embodiment of the invention, is at least as satisfactory, not only for resisting abrasion during wedge driving, but also for resisting abrasion in use due to periodic opening and closing of slot 14. The use of expensive and hard to work aromatic polyamide fibers may thus be eliminated, or made optional, by the present invention even in a driven wedge. An embedding layer 48a using a natural fiber reinforcement in either mat or woven form should be capable of resisting abrasion during driving and should thereafter be capable of resisting abrasion during use. Such use of a natural fiber reinforcement such as, for example, a cotton cloth, can thus result in a significant reduction in production cost for slot wedges manufactured in accordance herewith.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A dovetail wedge for use in a slot in a dynamoelectric machine, said slot being formed by aligned stacking of a plurality of laminations each having a corresponding slot therein, said slot including at least one dovetail slot therein, said at least one dovetail slot including first and second angled abutment surfaces:
   a wedge;
   said wedge including first and second angled lips loosely fittable within said first and second dovetail slots respectively;
   said first and second angled lips including first and second angled bearing surfaces respectively disposed at angles corresponding to angles of said first and second angled abutment surfaces;
   said wedge being made of a glass fiber in a cured resin matrix;
   a first embedding layer on said first angled bearing surface;
   a second embedding layer on said second angled bearing surface;
   said first and second embedding layers being effective to separate said first and second angled bearing surfaces from said first and second angled abutment surfaces respectively;
   each of said first and second embedding layers including a fiber in a resin matrix;
   said fiber being a non-abrasive fiber; and
   said first and second embedding layers having a thickness of from about 0.005 to about 0.1 inch whereby said laminations may be embedded within said thickness without penetrating through said embedding layer to said glass fiber wherein said non-abrasive fiber is a cotton fiber.

2. A dovetail wedge according to claim 1 wherein said cotton fiber includes at least one layer of a woven cotton cloth.

3. A dovetail wedge for use in a slot in a dynamoelectric machine, said slot being formed by aligned stacking of a plurality of laminations each having a corresponding slot therein, said slot including at least one dovetail slot therein, said at least one dovetail slot including first and second angled abutment surfaces:
   a wedge;
   said wedge including first and second angled lips loosely fittable within said first and second dovetail slots respectively;
   said first and second angled lips including first and second angled bearing surfaces respectively disposed at angles corresponding to angles of said first and second angled abutment surfaces;
   said wedge being made of a glass fiber in a cured resin matrix;
   a first embedding layer on said first angled bearing surface;
   a second embedidng layer on said second angled bearing surface;
   said first and second embedding layers being effective to separate said first and second angled bearing surfaces from said first and second angled abutment surfaces respectively;
   each of said first and second embedding layers including a fiber in a resin matrix;
   said fiber being a non-abrasive fiber; and
   said first and second embedding layers having a thickness of from about 0.005 to about 0.1 inch whereby said laminations may be embedded within said thickness without penetrating through said embedding layer to said glass fiber wherein said non-abrasive fiber is a natural fiber.

4. A dovetail wedge according to claim 5 wherein said wedge includes:
   an inclined lower surface on said wedge;
   a slide; and
   an inclined upper surface on said slide opposable against said inclined lower surface for urging said wedge substantially radially outward to urge said first and second angled bearing surfaces into abutment with said first and second angled abutment surfaces.

5. A dovetail wedge according to claim 3 wherein said non-abrasive fiber is a hemp fiber.

6. A dovetail wedge according to claim 3 wherein said non-abrasive fiber is a sisal fiber.

7. A dovetail wedge according to claim 3 wherein said non-abrasive fiber is a flax fiber.

8. A dovetail wedge for use in a slot in a dynamoelectric machine, said slot being formed by aligned stacking of a plurality of laminations each having a corresponding slot therein, said slot including at least one dovetail slot therein, said at least one dovetail slot including first and second angled abutment surfaces:
   a wedge;
   said wedge including first and second angled lips loosely fittable within said first and second dovetail slots respectively;
   said first and second angled lips including first and second angled bearing surfaces respectively disposed at angles corresponding to angles of said first and second angled abutment surfaces;
   said wedge being made of a glass fiber in a cured resin matrix;
   a first embedding layer on said first angled bearing surface;
   a second embedding layer on said second angled bearing surface;
   said first and second embedding layers being effective to separate said first and second angled bearing surfaces from said first and second angled abutment surfaces respectively;
   each of said first and second embedding layers including a fiber in a resin matrix;
   said fiber being a non-abrasive fiber; and
   said first and second embedding layers having a thickness of from about 0.005 to about 0.1 inch whereby said laminations may be embedded within said thickness without penetrating through said embedding layer to said glass fiber wherein said non-abrasive fiber is a synthetic resin fiber.

9. A dovetail wedge for use in a slot in a dynamoelectric machine, said slot being formed by aligned stacking of a pluralty of laminations each having a corresponding slot therein, said slot including at least one dovetail slot therein, said at least one dovetail slot including first and second angled abutment surfaces:
   a wedge;
   said wedge including first and second angled lips loosely fittable within said first and second dovetail slots respectively;
   said first and second angled lips including first and second angled bearing surfaces respectively disposed at angles corresponding to angles of said first and second angled abutment surfaces;
   said wedge being made of a glass fiber in a cured resin matrix;
   a first embedding layer on said first angled bearing surface;
   a second embedding layer on said second angled bearing surface;
   said first and second embedding layers being effective to separate said first and scond angled bearing surfaces from said first and second angled abutment surfaces respectively;
   each of said first and second embedding layers including a fiber in a resin matrix;
   said fiber being a non-abrasive fiber; and
   said first and second embedding layers having a thickness of from about 0.005 to about 0.1 inch whereby said laminations may be embedded within said thickness without penetrating through said embedding layer to said glass fiber wherein said non-abrasive fiber is a woven fiber.

10. A dovetail wedge for use in a slot in a dynamoelectric machine, said slot being formed by aligned stacking of a plurality of laminations each having a corresponding slot therein, said slot including at least one dovetail slot therein, said at least one dovetail slot including first and second angled abutment surfaces:
    a wedge;
    said wedge including first and second angled lips loosely fittable within said first and second dovetail slots respectively;
    said first and second angled lips including first and second angled bearing surfaces respectively disposed at angles corresponding to angles of said first and second angled abutment surfaces;
    said wedge being made of a glass fiber in a cured resin matrix;

a first embedding layer on said first angled bearing surface;

a second embedding layer on said second angled bearing surface;

said first and second embedding layers being effective to separate said first and econd angled bearing surfaces from said first and second angled abutment surfaces respectively;

each of said first and second embedding layers including a fiber in a resin matrix;

said fiber being a non-abrasive fiber; and said first and second embedding layers having a thickness of from about 0.005 to about 0.1 inch whereby said laminations may be embedded within said thickness without penetrating through said embedding layer to said glass fiber wherein said non-abrasive fiber is a natural fiber with a minor amount of a synthetic fiber.

11. A dovetail wedge according to claim 10 wherein said natural fiber is a cotton fiber.

12. A dovetail wedge for use in a slot in a dynamoelectric machine, said slot being formed by aligned stacking of a plurality of laminations each having a corresponding slot therein, said slot including at least one dovetail slot therein, said at least one dovetail slot including first and second angled abutment surfaces:

a wedge;

said wedge including first and second angled lips loosely fittable within said first and second dovetail slots respectively;

said first and second angled lips including first and second angled bearing surfaces respectively disposed at angles corresponding to angles of said first and second angled abutment surfaces;

said wedge being made of a glass fiber in a cured resin matrix;

a first embedding layer on said first angled bearing surface;

a second embedding layer on said second angled bearing surface;

said first and second embedding layers being effective to separate said first and second angled bearing surfaces from said first and second angled abutment surfaces respectively;

each of said first and second embedding layers including a fiber in a resin matrix;

said fiber being a non-abrasive fiber; and said firstland second embedding layers having a thickness of from about 0.005 to about 0.1 inch whereby said laminations may be embedded within said thickness without penetrating through said embedding layer to said glass fiber wherein said cured resin matrix includes a proportion of lubricating particles.

13. A dovetail wedge for use in a slot in a dynamoelectric machine, said slot being formed by aligned stacking of a plurality of laminations each having a corresponding slot therein, said slot including at least one dovetail slot therein, said at least one dovetail slot including first and second angled abutment surfaces:

a wedge;

said wedge including first and second angled lips loosely fittable within said first and second dovetail slots respectively;

said first and second angled lips including first and second angled bearing surfaces respectively disposed at angles corresponding to angles of said first and second angled abutment surfaces;

said wedge being made of a glass fiber in a cured resin matrix;

a first embedding layer on said first angled bearing surface;

a second embedding layer on said second angled bearing surface;

said first and second embedding layers being effective to separate said first and second angled bearing surfaces from said first and second angled abutment surfaces respectively;

each of said first and second embedding layers including a fiber in a resin matrix;

said fiber being a non-abrasive fiber; and said first and second embedding layers having a thickness of from about 0.005 to about 0.02 inch whereby said laminations may be embedded within said thickness without penetrating through said embedding layer to said glass fiber.

14. A dovetail wedge for use in a slot in a dynamoelectric machine, said slot being formed by aligned stacking of a plurality of laminations each having a corresponding slot therein, said slot including at least one dovetail slot therein, said at least one dovetail slot including first and second angled abutment surfaces comprising:

a wedge;

said wedge including first and second angled lips loosely fittable within said first and second dovetail slots respectively;

said first and second angled lips including first and second angled bearing surfaces respectively disposed at angles corresponding to angles of said first and second angled abutment surfaces;

an inclined lower surface on said wedge;

a slide;

an inclined upper surface on said slide opposable against said inclined lower surface for urging said wedge substantially radially outward to urge said first and second angled bearing surfaces into abutment with said first and second angled abutment surfaces;

said wedge being made of a glass fiber in a cured resin matrix;

a first embedding layer on said first angled bearing surface;

a second embedding layer on said second angled bearing surface;

said first and second embedding layers being effective to separate said first and second angled bearing surfaces from said first and second angled abutment surfaces respectively; and each of said first and second embedding layers including at least one ply of a woven cotton cloth in a cured resin matrix.

15. A dovetail wedge according to claim 14 wherein said at least one ply includes two plies.

16. A dovetail wedge according to claim 15 wherein said at least two plies have a cured thickness of from about 0.005 to about 0.1 inch.

17. A dovetail wedge according to claim 16 wherein said cured thickness is from about 0.01 to about 0.05 inch.

18. A dovetail wedge for use in a slot in a dynamoelectric machine, said slot being formed by aligned stacking of a plurality of laminations each having a corresponding slot therein, said slot including at least one dovetail slot therein, said at least one dovetail slot including first and second angled abutment surfaces:

a wedge;

said wedge including first and second angled lips loosely fittable within said first and second dovetail slots respectively;

said first and second angled lips including first and second angled bearing surfaces respectively disposed at angles corresponding to angles of said first and second angled abutment surfaces;

said wedge being made of a glass fiber in a cured resin matrix;

a first layer on said first angled bearing surface;

a second layer on said second angled bearing surface;

said first and second layers being effective to separate said first and second angled bearing surfaces from said first and second angled abutment surfaces respectively; and each of said first and second layers including a natural fiber in a cured resin matrix.

19. A dovetail wedged according to claim 18 wherein said natural fiber is a cotton fiber.

20. A dovetail wedge according to claim 19 wherein said cotton fiber is a woven cotton cloth.

21. A dovetail wedge according to claim 20 wherein said woven cotton cloth is from one to three overlapped plies.

22. A dovetail wedge according to claim 21 wherein said woven cotton cloth is two overlapped plies.

23. A dovetail wedge according to claim 18 wherein each of said layers of a natural fiber includes a thickness of from about 0.005 to about 0.1 inch.

24. A dovetail wedge according to claim 23 wherein said thickness is from about 0.01 to about 0.02 inch.

25. A dovetail wedge according to claim 18 wherein said dovetail wedge is a one-piece dovetail wedge adapted for driving into position along said dovetail slot.

26. A dovetail wedge according to claim 25 wherein said natural fiber includes a woven cotton cloth.

27. A dovetail wedge according to claim 26 wherein said woven cotton cloth includes a thickness of from about 0.005 to about 0.1 inch.

28. A dovetail wedge according to claim 27 wherein said thickness is from about 0.01 to about 0.02 inch.

29. A dovetail wedge for use in a slot in a dynamoelectric machine, said slot being formed by aligned stacking of a plurality of laminations each having a corresponding slot therein, said slot including at least one dovetail slot therein, said at least one dovetail slot including first and second angled abutment surfaces comprising:

a wedge;

said wedge including first and second angled lips fittable within said first and second dovetail slot, respectively;

said first and second angled lips including first and second angled bearing surfaces respectively disposed at angles corresponding to angles of said first and second angled abutment surfaces;

an inclined lower surface on said wedge;

a slide;

an inclined upper surface on said slide opposable against said inclined lower surface for urging said wedge substantially radially outward to urge said first and second angled bearing surfaces into abutment with said first and second angled abutment surfaces;

a first embedding layer on said first angled bearing surface;

a second embedding layer on said second angled bearing surface;

said first and second embedding layers being effective to separate said first and second angled bearing surfaces from said first and second angled abutment surfaces respectively; and each of said first and second embedding layers including a film of a synthetic resin.

30. A dovetail wedge according to claim 5 wherein said non-abrasive fiber is a jute fiber.

* * * * *